Jan. 9, 1951
H. HEINEMANN
2,537,756
DESULFURIZATION OF HYDROCARBONS
Filed Nov. 3, 1947
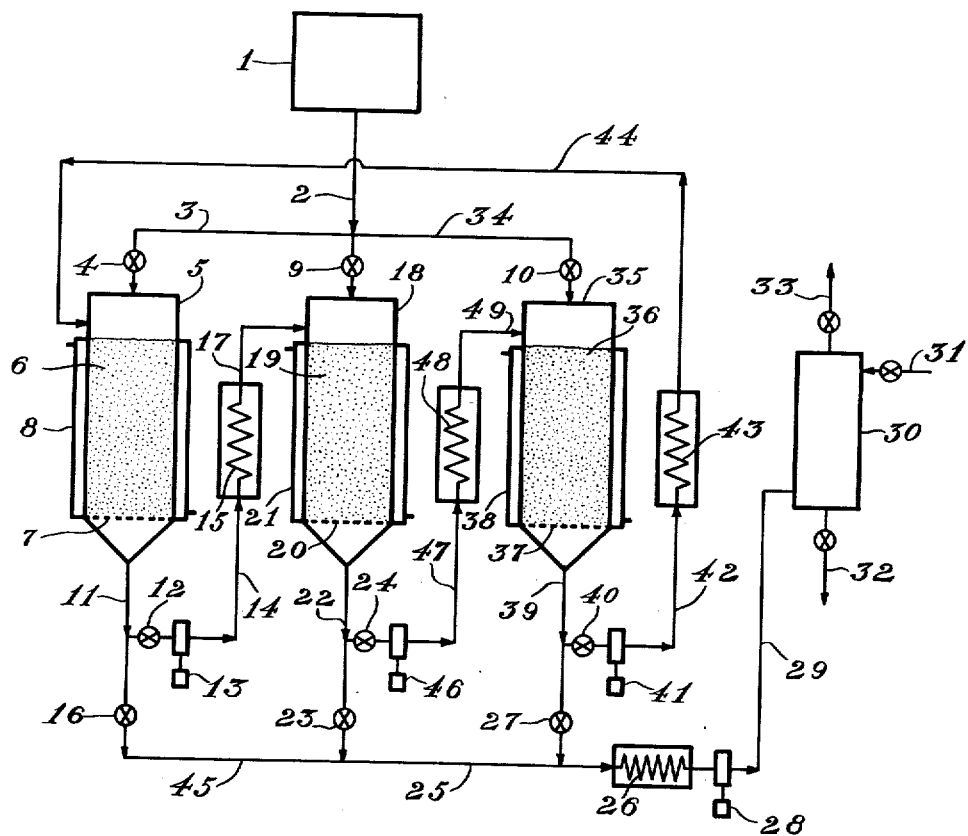
ATTEST
John G. Butz
INVENTOR.
Heinz Heinemann
BY Norbert E. Birch
Attorney Patented Jan. 9, 1951

2,537,756

UNITED STATES PATENT OFFICE 2,537,756

DESULFURIZATION OF HYDROCARBONS

Heinz Heinemann, Philadelphia, Pa., assignor to Porocel Corporation, Philadelphia, Pa., a corporation of Delaware Application November 3, 1947, Serial No. 783,833

4 Claims. (Cl. 196—28)

The present invention relates to the desulfurization of hydrocarbon distillates, particularly those derived from petroleum and exemplified by gasoline, naphtha, kerosine, and furnace oil.

The removal of sulfur compounds from hydrocarbon oils is of considerable importance in the refining of petroleum and is widely practiced. Sulfur compounds are particularly detrimental when present in motor fuel due to their corrosiveness and their tendency to reduce the lead susceptibility of fuels such as gasoline.

The known processes of removing sulful compounds from hydrocarbon oils fall into several groups and affect various types of sulfur compounds. Treatment with caustic soda solutions will readily remove hydrogen sulfide, and modification of the caustic soda treatment will permit substantial removal of mercaptans. The so-called "doctor treatment" with aqueous sodium plumbite and elemental sulfur will convert mercaptans to disulfides, but will not affect a reduction in sulfur content. Catalytic treatment of sulfur-containing hydrocarbon oil at high temperatures with activated fuller's earth or bauxite will decompose organic sulfur compounds to hydrogen sulfide to a greater or less degree depending upon the type of sulfur compound involved. The same result is obtained by destructive hydrogenation of sulfur-containing hydrocarbon oils with hydrogen in the presence of a suitable catalyst.

I have found that desulfurization of hydrocarbon oils, particularly distillates, may be carried out in the presence of activated bauxite under varying conditions, depending upon the type of sulfur compound to be removed. I have further found that thiophene and mercaptan type compounds are preferentially adsorbed by activated bauxite at temperatures between 50° F. and 200° F. to the extent of 90% to 100% of their content in the distillate, while sulfides and disulfides are adsorbed to a lesser degree. Additionally, I have found that adsorption of sulfur compounds does not reduce the efficiency of the activated bauxite when substantially used as a sulfur compound decomposition catalyst at higher temperatures, i. e., 600° F. to 850° F. Accordingly, a very complete desulfurization of hydrocarbons can be obtained by removing thiophene and mercaptan compounds by adsorption at low temperature, followed by catalytic decomposition of the remaining sulfur compounds at higher temperatures.

In a preferred embodiment of my invention, I treat hydrocarbons containing sulfur compounds by liquid phase percolation through a body of activated bauxite at 50° F. to 200° F. to obtain adsorption primarily of thiophene and mercaptan type compounds, then vaporize and heat the partially desulfurized hydrocarbon effluent from the body of bauxite to a temperature between 600° F. and 850° F. and contact it at this temperature with a second body of activated bauxite to decompose the residual sulfur compounds to hydrogen sulfide. The hydrocarbon effluent from the second body of bauxite is then treated to remove hydrogen sulfide, as by caustic washing, and is then substantially sulfur-free. After the first body of bauxite becomes saturated with sulfur compounds and no longer adsorbs them readily, it may be used as a decomposition catalyst in the second stage high temperature removal of residual sulfur compounds, the initially adsorbed thiophene and mercaptan compounds being converted to hydrogen sulfide during the heating of the saturated bauxite to 600° F. to 850° F. and during the decomposition of the residual sulfur compounds in the partially desulfurized hydrocarbons at these high temperatures. When the second body of bauxite becomes exhausted in the high temperature desulfurization step due to accumulation of tarry or carbonaceous matter, it may be regenerated by stripping with steam or other inert gas, e. g. carbon dioxide, nitrogen, flue gas, etc., and then calcined at 900° F. to 1200° F. in the presence of air to burn off the carbonaceous deposits. The regenerated bauxite, after cooling, may be used in the first stage or low temperature adsorption desulfurization.

In carrying out the process, the initial or low temperature adsorption of sulfur compounds is effected at 50° F. to 200° F., and preferably at 70° F. to 120° F., the space velocity ranging from 0.5 to 5, and preferably 0.5 to 2, volumes of hydrocarbon per volume of bauxite per hour. The bauxite is prepared by calcining granular bauxite at 600° F. to 1200° F., and preferably at 1000° F. to 1200° F., for sufficient time to reduce the water content to 6% by weight or less, and preferably to 2% or less. The second stage desulfurization treatment is affected at 600° F. to 850° F., and preferably at 700° F. to 800° F., using spent bauxite containing sulfur compounds adsorbed from the hydrocarbons in the first stage or low temperature treatment. The space velocity in the second stage treatment may range from 1 to 5 or 6 volumes of hydrocarbon per volume of bauxite per hour.

The present invention may be further understood with reference to the accompanying drawing which illustrates diagrammatically a system suitable for carrying out my process.

Referring to the drawing, a hydrocarbon distillate such as gasoline containing various organic sulfur compounds is passed from storage vessel 1 through pipes 2 and 3, and valve 4 into the top of tower 5 filled with activated granular bauxite 6 supported on screen or grid 7 and maintained at a temperature of, for example, 70° F., by circulation of a heat exchange medium through jacket 8 surrounding tower 5, valves 9 and 10 being closed. The gasoline is percolated downwardly through the bauxite at 70° F. and at a rate of 2 volumes per volume of bauxite per hour, the thiophene and mercaptan type compounds being adsorbed and retained by the bauxite. A portion of the sulfides and disulfides contained in the gasoline is also adsorbed but to a lesser degree. The partially desulfurized effluent from tower 1 is passed through pipe 11 and valve 12 to pump 13 and is delivered thereby through pipe 14 to heating coil 15, valve 16 being closed. In coil 15 the gasoline is vaporized and heated to about 700° F., and the vapors are introduced by pipe 17 into a second tower 18 containing activated granular bauxite 19 supported upon screen 20. A heat exchange medium is circulated through jacket 21 of tower 18 to assist in maintaining the temperature of its contents at about 700° F. The residual sulfur compounds in the gasoline vapors, e. g., sulfides and disulfides, together with any unadsorbed thiophenes or mercaptans, are decomposed to hydrogen sulfide in passing through the hot bauxite, and the gasoline vapors and hydrogen sulfide are drawn from the bottom of tower 18 through pipe 22 and valve 23, valve 24 being closed. The gasoline vapors and gas are passed by means of pipe 25 to condenser 26 wherein the gasoline vapors are condensed, valve 27 being closed. The condensate and hydrogen sulfide are delivered by pump 28 and pipe 29 to the lower section of scrubbing tower 30. Caustic soda solution or other basic reagent is introduced into the upper section of tower 30 by means of valve-controlled pipe 31, and flows downwardly therethrough in intimate countercurrent contact with the upwardly flowing condensate. The hydrogen sulfide is thus neutralized and removed with the spent caustic solution drawn from the bottom of the tower through valve-controlled pipe 32, while the desulfurized gasoline condensate is drawn from the top of the tower by means of valve-controlled pipe 33 and passed to storage (not shown).

At such time as the bauxite in tower 5 becomes saturated with adsorbed sulfur compounds and its adsorbent efficiency reaches a low level, such bauxite may then be used as a catalyst for the second stage or high temperature treatment to convert the residual sulfur compounds in the gasoline to hydrogen sulfide. Likewise, when the bauxite in tower 18 becomes spent in the high temperature conversion due to accumulation of carbonaceous materials, it may be regenerated in situ or removed and subjected to steaming and calcination at elevated temperature in the presence of air to burn off the carbonaceous materials.

In this case, untreated gasoline is supplied from vessel 1 through pipes 2 and 34, and valve 10 to the third tower 35 containing activated bauxite 36 supported on screen 37, valves 4 and 9 being closed. Tower 35 is provided with jacket 38 through which a heat exchange medium may be circulated to maintain the temperature of its contents at about 70° F. The gasoline percolating downwardly through the bauxite in tower 35 at 70° F. is relieved of a substantial proportion of its thiophene and mercaptan type sulfur compounds by adsorption, and is drawn from the bottom of the tower through pipe 39 and valve 40, valve 27 being closed. The partially desulfurized gasoline is then pumped by pump 41 through pipe 42, heated to 700° F. in heating coil 43, and delivered by pipe 44 to the upper section of tower 5. In the meanwhile, the bauxite in tower 5 containing adsorbed thiophenes and mercaptans is brought to a temperature of 700° F. by passing a heating medium through jacket 8 of the tower. During this heating period, the adsorbed sulfur compounds commence to decompose with the formation of hydrogen sulfide, and during the passage of the partially desulfurized gasoline vapors through the bauxite, the remaining adsorbed sulfur compounds are converted to hydrogen sulfide, as are the residual sulfur compounds contained in the gasoline vapors. The vapor effluent is withdrawn from the bottom of tower 5 through pipe 11, valve 12 being closed, and is passed through valve 16 and pipes 45 and 25 to condenser 26, valve 23 being closed. The resulting gasoline condensate and hydrogen sulfide are delivered by pump 28 and pipe 29 to the caustic scrubber 30, wherein the hydrogen sulfide is removed from the gasoline condensate as described hereinbefore.

When the bauxite in tower 35 becomes saturated with adsorbed sulfur compounds and the bauxite in tower 5 becomes ineffective through the accumulation of carbonaceous materials, the cycle is again shifted, and the bauxite in tower 5 is regenerated by steaming and calcination.

Untreated gasoline is now passed from vessel 1 through pipe 2 and valve 9 into the top of tower 18 containing regenerated bauxite, valves 4 and 10 being closed. The gasoline percolating downwardly through the bauxite in tower 18 at 70° F. is relieved of its thiophene and mercaptan type sulfur compounds by adsorption and is drawn from the bottom of the tower through pipe 22 and valve 24, valve 23 being closed. The partially desulfurized gasoline is then pumped by pump 46 through pipe 47, heated to 700° F. in heating coil 48, and delivered by pipe 49 to the upper section of tower 35. Meanwhile, the bauxite in tower 35 containing adsorbed thiophenes and mercaptans is brought to a temperature of 700° F. by passing a heating medium through jacket 38 of the tower. During this heating period, the adsorbed sulfur compounds begin to decompose with the formation of hydrogen sulfide, and during the passage of the partially desulfurized gasoline vapors through the bauxite, the remaining adsorbed sulfur compounds are converted to hydrogen sulfide, as are the residual sulfur compounds contained in the gasoline vapors. The vapor effluent is withdrawn from the bottom of tower 35 through pipe 39, valve 40 being closed, and is passed through valve 27 to condenser 26, valves 16 and 23 being closed. The resulting gasoline condensate and hydrogen sulfide are passed by pump 28 and pipe 29 to the caustic scrubbing tower 30, wherein the hydrogen sulfide is removed from the gasoline condensate, and the latter is passed through valve-controlled pipe 33 to storage (not shown).

The effectiveness of activated bauxite in removing various types of sulfur compounds at various temperatures is shown in the following table. Individual samples were made up, each consisting of a sulfur-free naphtha in which was dissolved a single organic sulfur compound. Each sample was then contacted with fresh bauxite which had been activated by heating at 1200° F. to a water content of 1.5%, and then cooled. The results, expressed in percent sulfur reduction, are given below.

| Compound | Per cent sulfur reduction | |
|---|---|---|
| | 80° F. | 700° F. |
| Thiophene | 95 | 22 |
| Ethyl Disulfide | 81 | 94 |
| Carbon Disulfide | 58 | 99 |
| Butyl Mercaptan | 96 | 58 |
| Carbonyl Sulfide | 89 | 99 |

From the above data, it is evident that thiophene and mercaptan type sulfur compounds are much more effectively removed by adsorption at relatively low temperature, whereas sulfides and disulfides are more readily removed by conversion at high temperature. By combining the two treatments, a most effective overall removal is achieved.

I claim:

1. A method of desulfurizing hydrocarbon distillate, which comprises contacting said distillate with activated bauxite at a temperature between 50° F. and 200° F. to adsorb thiophene and mercaptan type sulfur compounds, thereafter contacting the partially desulfurized distillate with activated bauxite at a temperature between 600° F. and 850° F. to decompose the remaining sulfur compounds to hydrogen sulfide, and removing the hydrogen sulfide from the hydrocarbon distillate.

2. A method of desulfurizing petroleum naphtha, which comprises contacting said naphtha with activated bauxite at a temperature between 70° F. and 120° F. to adsorb thiophene and mercaptan type sulfur compounds, thereafter contacting the partially desulfurized naphtha with activated bauxite at a temperature between 700° F. and 800° F. to decompose the remaining sulfur compounds to hydrogen sulfide, and removing the hydrogen sulfide from the naphtha.

3. A method of desulfurizing hydrocarbon distillate, which comprises contacting said distillate with activated bauxite at a temperature between 50° F. and 200° F. to adsorb thiophene and mercaptan type sulfur compounds, thereafter contacting the partially desulfurized distillate with activated bauxite containing adsorbed thiophene and mercaptan type sulfur compounds at a temperature between 600° F. and 850° F. to decompose the adsorbed sulfur compounds and the sulfur compounds remaining in the distillate to hydrogen sulfide, and removing the hydrogen sulfide from the distillate.

4. A method of desulfurizing hydrocarbon distillate, which comprises contacting said distillate with activated bauxite at a temperature between 50° F. and 200° F. to adsorb thiophene and mercaptan type sulfur compounds, heating activated bauxite containing adsorbed thiophene and mercaptan type sulfur compounds to a temperature between 600° F. and 850° F. to initiate the decomposition of the adsorbed sulfur compounds, contacting the partially desulfurized distillate with the heated bauxite to decompose the residual sulfur compounds in the distillate and the adsorbed sulfur compounds in the bauxite to hydrogen sulfide, and removing the hydrogen sulfide from the distillate.

HEINZ HEINEMANN.

REFERENCES CITED

The following references are of record in the file of this patent:

UNITED STATES PATENTS

| Number | Name | Date |
|---|---|---|
| 2,253,308 | Rosen | Aug. 19, 1941 |
| 2,312,020 | Bottomley | Feb. 23, 1943 |
| 2,340,922 | Bent et al. | Feb. 8, 1944 |
| 2,367,348 | Harrington | Jan. 16, 1945 |
| 2,371,298 | Hudson | Mar. 13, 1945 |

OTHER REFERENCES

"Catalytic Desulfurization—for Many Straight-Run Gasolines," Pet. Processing, Nov. 1946, pages 208 and 210.

Helmers et al.: "Catalytic Desulfurization—Over Bauxite," Pet. Processing, Feb. 1948, pages 133 to 138.